United States Patent [19]

Heinzl

[11] 4,200,769
[45] Apr. 29, 1980

[54] PROCESS AND ARRANGEMENT FOR SELECTIVELY TRANSMITTING PREDETERMINED CHARACTERS OR GRAPHIC PATTERNS

[75] Inventor: Joachim Heinzl, Munich, Fed. Rep. of Germany

[73] Assignee: Siemens Aktiengesellschaft, Berlin & Munich, Fed. Rep. of Germany

[21] Appl. No.: 942,928

[22] Filed: Sep. 18, 1978

[30] Foreign Application Priority Data

Oct. 27, 1977 [DE] Fed. Rep. of Germany ....... 2748253

[51] Int. Cl.² .................. B41J 5/00; G06K 15/02; H04L 15/24
[52] U.S. Cl. ............................. 178/30; 178/23 R; 400/111
[58] Field of Search ............... 178/23 R, 25, 26 R, 178/26 A, 30, 17.5; 400/109, 111; 340/324 A, 324 AD

[56] References Cited

U.S. PATENT DOCUMENTS 4,137,425  1/1979  Ferroglio et al. .................. 178/30

Primary Examiner—Thomas A. Robinson
Attorney, Agent, or Firm—Hill, Van Santen, Steadman, Chiara & Simpson

[57] ABSTRACT

Predetermined characters or graphic patterns are transmitted from a transmitting station to a receiving station in a system wherein a printing head is provided with at least one printing component in the receiving station and is supplied with binary character sequences which trigger printing commands. The binary character sequences which represent the predetermined characters are stored in the receiving station in a character generator from which the sequences are read following the transmission of data words assigned to the predetermined characters, and are fed to the printing head. When graphic patterns are transmitted, code words are produced in the transmitting station to describe the graphic patterns, which words possess the same format as the data words. The code words are transmitted in place of the data words to the receiving station and in the receiving station the code words are converted into binary character sequences which are fed to the printing head in the place of the binary character sequences emitted from the character generator.

13 Claims, 1 Drawing Figure

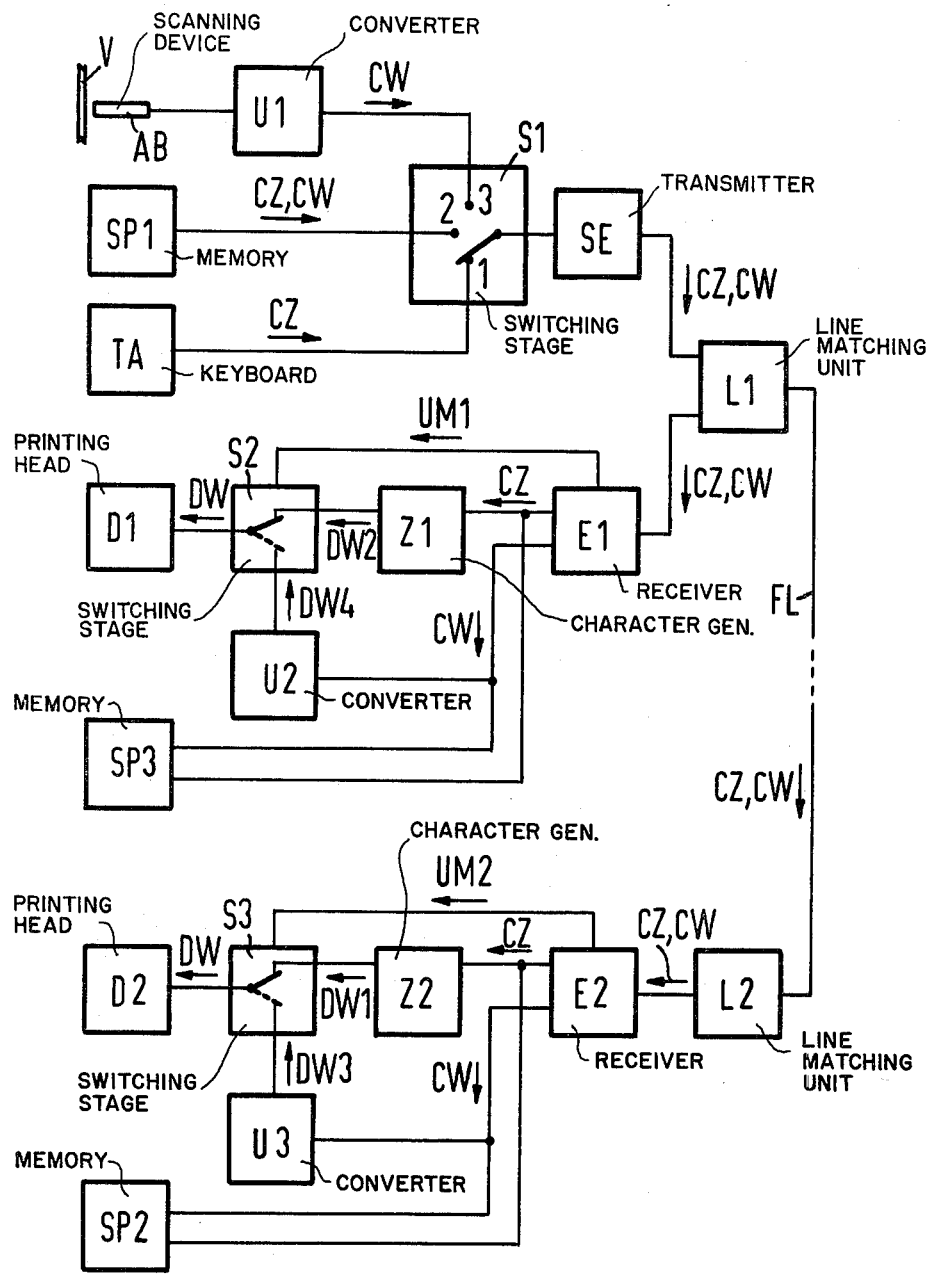

PROCESS AND ARRANGEMENT FOR SELECTIVELY TRANSMITTING PREDETERMINED CHARACTERS OR GRAPHIC PATTERNS

CROSS-REFERENCE TO RELATED APPLICATION

This application is related to my co-pending application entitled "A Method Of And Apparatus For Printed Character Transmission And Reception", Ser. No. 942,915, filed on even date herewith.

BACKGROUND OF THE INVENTION

1. Field of the Invention

The invention relates to a process for selectively transmitting predetermined characters or graphic patterns from a transmitting station to a receiving station wherein a printing head provided with at least one printing component is arranged in the receiving station, wherein the printing head is supplied with binary character sequences which trigger printing commands, and wherein the data words which represent the predetermined characters are stored, in the receiving station, in a character generator from which they are read following the transmission of data words assigned to the predetermined characters and are fed to the printing head. The present invention also relates to an arrangement for execution of the process.

2. Description of the Prior Art

In teleprinters or data printers, alphanumeric characters and symbols are transmitted by means of data words from a transmitting station to a receiving station. When the characters are input by means of a keyboard or by means of a memory, the data words are produced in the transmitting station. In the receiving station the data words are fed to a printing device which prints out the appropriate characters. In a printing station disclosed in a publication by B. Peukert and H. Senger: Schreibstation PT80, Siemens Magazine 51, 1977, Vol. 4, pp. 215-218, fully incorporated herein by this reference, in the receiving station the characters are represented in a predetermined pattern of matrix points by means of a mosaic printing head. The mosaic printing head consists either of a needle printing head provided with a plurality of printer needles driven by moving coils or an ink printing head provided with a plurality of nozzles controlled by piezoceramic components. The characters are represented, for example, in a pattern of 12×9 matrix points. This known printing station does not provide a representation of graphic patterns which differ from the predetermined characters, such as, for example, pictorial representations.

It is also known to transmit graphic patterns by facsimile transmission. If, however, facsimile transmission is also to be used to transmit predetermined characters, such as, for example, alphanumeric characters and symbols, these must likewise be scanned and transmitted in accordance with the facsimile process.

It is also known to transmit coarse graphic patterns by printing alphanumeric characters one above another and beside one another. Graphic patterns transmitted in this manner, however, only have a low resolution.

SUMMARY OF THE INVENTION

Therefore, the object of the present invention is to provide a process and structure for selectively transmitting predetermined characters and graphic patterns wherein the predetermined characters are transmitted by means of data words and wherein, when graphic patterns are transmitted, the patterns are represented with a high degree of resolution.

According to the invention, the foregoing object is achieved in a process of the type described above in that, when graphic patterns are to be transmitted, in the transmitting station code words are produced which describe the graphic patterns, that the code words are transmitted in place of the data words to the receiving station, and that in the receiving station the code words are converted into binary character sequences which are supplied, in place of the binary character sequences emitted from the character generator, to the printing head.

The process of the present invention has the advantage that, in addition to predetermined characters, it is also possible to transmit graphic patterns, such as facsimile or special characters, between stations without the need to make new arrangements for the transmission equipment and exchange equipment. Therefore, it is possible to represent graphic patterns employing a mosaic printing head normally provided for the reproduction of predetermined characters. Only slight modifications are required in the transmitting and receiving stations so that the transmission of graphic patterns in addition to the transmission of predetermined characters necessitates only a small additional expense.

If known teleprinter or data networks are provided by way of a transmission link, it is advantageous for the data words and the code words to possess the same format and to represent teleprinter characters. In particular it is advantageous for the teleprinter characters to be coded in accordance with the CCITT Code No. 5.

In the case of facsimile transmission, it is expedient for the code words to be produced in the transmitting station following the scanning of a format provided with graphic patterns.

If the graphic patterns are not scanned directly prior to the transmission, or if the same graphic patterns are frequently transmitted, it is advantageous for the code words to be stored in the transmitting station.

If the printing head possesses more printing components than the code word possesses binary characters, it is expedient for each transmitted code word to represent at least a part of a binary character sequence which is fed to the printing head.

It is possible to transfer between the transmission of predetermined characters and the transmission of graphic patterns in a simple manner by transmitting transfer characters with the aid of which, in the receiving station, the received binary character sequences or the binary character sequences emitted from the character generator in the receiving station are switched through to the printing head.

If the printing head is not moved continuously, but only a number of printing elements which corresponds to the number of printing elements within a character is carried out, it is expedient for a predetermined sequence of code words to be intermediately stored in the receiving station.

If the graphic patterns do not represent a format or stored code words, it is favorable for the graphic patterns to be able to be input by means of a keyboard provided for the input of predetermined characters.

An advantageous arrangement for the execution of the process of the present invention is characterized in that in the transmitting station there is arranged a memory which stores the code words and/or there is provided a scanning device which scans formats provided with graphic patterns and, by means of a coder, produces the code words, that a first switching stage is provided which switches through the data words to the transmission link when predetermined characters are transmitted and which switches through the code words to the transmission link when graphic patterns are transmitted, and that in the receiving station there is provided a second switching stage which, in dependence upon transfer characters, switches through to the printing head either those binary character sequences emitted from the character generator or those binary character sequences produced by means of a further converter from the received code words.

If the scanning device scans the format simultaneously in a plurality of lines, it is advantageous for the converter to be preceded by an intermediate memory in which the scanning values arising in the case of simultaneous scanning of the format in a plurality of lines are intermediately stored.

If the number of binary characters of the code words is smaller than the number of binary characters of the binary character sequences, or if the printing head is moved only character-by-character and executes a predetermined number of printing elements which is equal to the number of printing elements within a predetermined character, it is expedient for the further converter to contain a memory which intermediately stores as many code words as are required to produce the binary character sequence assigned to a predetermined character.

If the graphic patterns are not to be represented directly following reception, or are to be stored for a later, further representation, it is favorable for the receiving station to contain a further memory in which the received code words can be stored.

BRIEF DESCRIPTION OF THE DRAWING

Other objects, features and advantages of the invention, its organization, construction and operation will be best understood from the following detailed description, taken in conjunction with the accompanying drawing, on which there is a single FIGURE which is a block circuit diagram representation of a transmitting station equipped with transmitting and receiving devices and of a receiving station which is connected to the transmitting station, only the receiving devices of the receiving station being illustrated, which devices are of similar construction to the receiving devices of the transmitting station.

DESCRIPTION OF THE PREFERRED EMBODIMENTS

Referring to the drawing, when predetermined characters are to be transmitted, such as, for example, alphanumeric characters and symbols, these characters are input by way of a keyboard TA. The keyboard TA produces binary data words CZ which are transmitted to a transmitter SE by way of a switch in a switching stage S1. In the switching stage S1, the switch occupies the position 1. If the data words CZ are input by way of a memory SP1, the switch S1 occupies the position 2. The data words CZ pass by way of a line matching unit L1 to a trunk line FL over which they are transmitted to the receiving station.

In the receiving station, the data words CZ are fed by way of a line matching unit L2 to a receiver E2. The receiver E2 emits the data words CZ to a character generator Z2 which stores binary character sequences DW1 assigned to the data words CZ, for the surface representation of the transmitted characters from point elements. These binary character sequences DW1 pass via a switching stage S3 in which a switch occupies the solid-line position, to a printing head D2 which, for example, is provided with a plurality of printing components. Each binary character of the binary character sequence DW1 is assigned to a specific printing component and when the binary character assumes a first binary value, for example the binary value "1", this printing component is actuated.

When the characters are represented in a matrix of $12 \times 9$ points, the printing head is supplied, for example, with nine binary character sequences DW1, each comprising twelve binary characters. The data words CZ can also be fed to a memory SP2. The characters can be represented in the same manner in the transmitting station as in the receiving station. The data words CZ are fed via the line matching unit L1 to a receiver E1 in the transmitting station where they pass to a character generator Z1 which stores binary character sequences DW2 corresponding to the character sequences DW1. The character sequences DW2 are fed via a switching stage S2 to a printing head D1 where the characters are printed out, for example, for checking purposes.

If a facsimile transmission is carried out employing the two stations, a format V provided with a graphic pattern is scanned with the aid of a scanning device AB. Scanner signals produced by the scanning device AB are fed to a converter U1 which produces code words CW having the same format as the data words CZ, for example a format of teleprinter characters coded in accordance with CCITT Code No. 5. The switch in the switching stage S1 assumes the position 3 and the code words CW are emitted in place of the data words CZ to the trunk line FL via the transmitter SE and the line matching unit L1. Prior to the facsimile transmission, a transfer character is transmitted to the receiving station by which the receiving station is informed that the subsequently transmitted teleprinter characters describe a graphic pattern. This transfer character is recognized in the receiver E2 and the receiver E2 feeds the switching stage S3 with a transfer signal UM2 which operates the switch into the broken-line position. The teleprinter signal ESC6 corresponding to the CCITT Code No. 5 can be used, for example, as the transfer signal.

The code words CW reach a converter U3 by way of the line matching unit L2 and the receiver E2. From the code words CW, the converter U3 produces binary character sequences DW3 which are suitable to operate the printing head D2. These character sequences DW3 are fed via the switching stage S3 to the printing head D2.

If the printing head D2 contains eight printing components which are simultaneously operable, the code words CW can be directly switched through to the printing head since the code words CW and the data words CZ contain eight binary characters when coded in accordance with the CCITT Code No. 5. Under these circumstances, it is advantageous for the scanning device AB to simultaneously scan the format V in eight lines so that the code words CW can be directly produced from the scanner signals. Within the code words CW and the binary sequence DW3, a binary character having a binary value "1" then in each case indicates which printing component is being actuated. Therefore, in the receiving station, graphic patterns are represented similarly to predetermined characters with the aid of the printing head D2. The representation again takes place in as many lines as there are printing components provided.

The graphic patterns can also be printed out for checking purposes in the transmitting station. In this case, the receiver E1 recognizes the transfer character and feeds the switching stage S2 with a transfer signal UM1 which operates the switch S2 into the broken-line position. The code words CW emitted from the transmitter SE are fed to the converter U2 by way of the line matching unit L1 and the receiver E1. The converter produces binary character sequences DW4 in the same manner as the converter U3 and emits the binary character sequences DW4 as character sequences DW to the printing head D1.

The graphic patterns can also be input with the aid of the memory SP1 if the memory also stores transfer characters and code words CW. In this case, the switch within the switching stage S1 assumes the position 2 and the transfer characters and code words CW are transmitted from the memory SP1 to the transmitter SE and in the receiving station are analyzed in the same manner as the code words CW produced during the scanning of a format.

If the scanning is carried out in a number of lines which exceeds the number of binary characters of the code words CW, in the converter U1 the scanner signals are distributed between a plurality of code words CW and are subsequently transmitted. Correspondingly, in the converter U3 a plurality of code words CW are assembled to form a character sequence DW3 when the number of printing components in a printing head D2 exceeds the number of binary characters in the code words CW.

If a transmission of graphic patterns is followed by a transmission of alphanumeric characters, the transmitting station again emits a transfer character which, with the aid of the transfer signals UM1 and UM2, brings the switches within the switching stages S2 and S3 back into the solid-line positions. The subsequently transmitted teleprinter characters are again interpreted as data words CZ and fed to the character generators Z1 and Z2. If, in the case of a facsimile transmission, white areas which are larger than the area assigned to an "interspace" character are scanned on the format V, the converter U1 emits a transfer character which switches over from the transmission of graphic patterns to the transmission of alphanumeric characters, and subsequently emits the data words CZ for interspace. If dark spots again appear after the white areas, a transfer back is made to the transmission of graphic patterns and data words CW are transmitted again in place of the "interspace" data words. In this manner it is possible to save transmission time and to avoid redundancy. Using the converters U1–U3 it is also possible to execute known processes for reducing the redundancy in the transmission of graphic patterns.

If the printing head D1 or D2 is not moved continuously during the reproduction of predetermined characters or of graphic patterns, but is only displaced character-by-character, it is expedient for the converters U2 and U3 to contain a memory which stores as many code words CW as are necessary to produce a number of character sequences DW3 and DW4 in the case of the transmission of a character.

Similarly to the received data words CZ, the received code words CW can also be stored within the memory SP2. These words are supplied to the memory SP2 in the same manner as the data words CZ.

If the graphic patterns neither represent a format V, nor are stored in the memory SP1, it is possible to input the graphic patterns via the keyboard TA. For example, in the representation of graphic patterns with eight printing components, the numerical keys 1 to 8 indicate which printing component is to be actuated. Following the input of the corresponding digits, it is recognized that a code word CW is complete, for example, by the actuation of the "interspace" key and the code word CW produced in this manner is fed to a memory SP3 which is provided in the transmitting device and which is arranged in the same manner as the memory SP2 in the receiving station.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. In a process for transmitting predetermined characters or graphic patterns from a transmitting station to a receiving station, wherein the receiving station includes a printing head having at least one printing component and is supplied with binary character sequences of data words which trigger printing commands, a character generator is provided in the receiving station to store binary character sequences which represent the predetermined characters and emit the sequences to the printing head upon receipt of data words assigned to the predetermined characters, the improvement for graphic pattern transmission comprising the steps of:
   producing code words representing graphic patterns and having the same format as the data words; transmitting the code words in place of the data words from the transmitting station to the receiving station; receiving the code words at the receiving station; converting the received code words into binary character sequences; and
   feeding the last-mentioned binary character sequences to the printing head in place of the first-mentioned binary character sequences.

2. The improved process of claim 1, further defined by:
   producing the data words and the code words in the same format representing teleprinter words.

3. The improved process of claim 2, further defined by:
   producing the teleprinter words in accordance with the CCITT Code No. 5.

4. The improved process of claim 1, further comprising the step of:
   producing the code words by scanning a format having graphic patterns thereon.

5. The improved process of claim 1, further comprising the step of:
   storing the code words to be transmitted in the transmitting station.

6. The improved process of claim 1, further defined by:
   producing the code words to represent at least a portion of a binary sequence for operating the printing head.

7. The improved process of claim 1, comprising the further steps of:
   transmitting a respective transfer signal from the transmitter to the receiver indicating the subsequent transmission of data words or code words, respectively; and switching through to the printing head signals corresponding to the respective transfer signal.

8. The improved process of claim 1, comprising the further step of:
   intermediately storing a predetermined sequence of code words in the receiving station.

9. The improved process of claim 1, wherein the step of producing code words is further defined as:
   generating and inputting the code words with a keyboard code word generator.

10. An arrangement for transmitting predetermined characters and graphic patterns, comprising:
    a transmitting station,
    a receiving station,
    a transmission medium connecting said transmitting and receiving stations,
    a memory storing code words in said transmitting station representing graphic patterns,
    a data word generator in said transmitting station for generating data words representing alphanumberic characters,
    scanning means including a first converter in said transmitting station for scanning a format of graphic patterns and producing corresponding code words,
    a transmitter in said transmitting station connected to said transmission medium,
    said memory, said data word generator and said scanning means also including means producing respective transfer signals characteristic of data words and code words,
    a first switching stage connected to said data word generator, to said memory, to said scanning means and to said transmitter and operable in response to a transfer signal to selectively connect said memory or said scanning means or said data word generator to said transmitter,
    a receiver in said receiving station connected to said transmission medium,
    a character generator connected to said receiver and operable to produce first binary character sequences in response to received data words,
    a second converter connected to said receiver and operable to produce second binary character sequences in response to received code words,
    a printing head, and
    a second switching stage connected to said printing head and connected to said character generator and to said second converter and operable in response to said transfer signals to selectively connect said first and second binary character sequences to said printing head.

11. The arrangement of claim 10, wherein
    said first converter includes an intermediate memory, and
    said scanning means includes a scanning device for scanning a plurality of lines simultaneously and storing the scanning results in said intermediate memory.

12. The arrangement of claim 10, wherein
    said second converter includes an intermediate memory for storing as many code words as are required to produce a first binary character assigned to a predetermined character.

13. The arrangement of claim 10, comprising
    an additional memory in said receiving station connected to said receiver for storing received code words.

* * * * *